ated under 35

United States Patent
Swarup et al.

(10) Patent No.: US 7,288,595 B2
(45) Date of Patent: Oct. 30, 2007

(54) POLYETHER CARBAMATE COMPOUNDS, COMPOSITIONS CONTAINING SUCH COMPOUNDS, AND METHODS RELATED THERETO

(75) Inventors: Shanti Swarup, Allison Park, PA (US); Michael P. Hart, Cleveland Heights, OH (US); Christiana Yichun Jia, University Heights, OH (US); Edward S. Pagac, Portersville, PA (US); Cathy A. Taylor, Allison Park, PA (US); Elizabeth A. Zezinka, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 315 days.

(21) Appl. No.: 10/949,637

(22) Filed: Sep. 24, 2004

(65) Prior Publication Data
US 2005/0065291 A1    Mar. 24, 2005

Related U.S. Application Data

(62) Division of application No. 10/028,839, filed on Dec. 20, 2001, now abandoned.

(51) Int. Cl.
| C08L 61/00 | (2006.01) |
| C08L 63/00 | (2006.01) |
| C08L 67/00 | (2006.01) |
| C08L 71/00 | (2006.01) |
| C08L 75/04 | (2006.01) |

(52) U.S. Cl. ........................ 525/157; 525/162; 525/163; 525/186; 525/399; 525/400; 525/438; 525/439; 525/440; 525/453; 525/523; 525/528

(58) Field of Classification Search ................ 525/157, 525/162, 163, 186, 399, 400, 438, 439, 440, 525/453, 523, 528
See application file for complete search history.

(56) References Cited

U.S. PATENT DOCUMENTS

| 4,122,069 | A |   | 10/1978 | Meyer .......................... 528/93 |
| 4,435,559 | A |   | 3/1984  | Valko .......................... 528/73 |
| 4,704,446 | A |   | 11/1987 | Goel ........................... 528/78 |
| 4,820,830 | A |   | 4/1989  | Blank ......................... 560/158 |
| 4,883,854 | A |   | 11/1989 | Coury et al. .................. 528/28 |
| 5,071,904 | A |   | 12/1991 | Martin et al. ................ 524/458 |
| 5,134,205 | A |   | 7/1992  | Blank ......................... 525/509 |
| 5,340,889 | A |   | 8/1994  | Crawford et al. ............. 525/523 |
| 5,510,148 | A |   | 4/1996  | Taljan et al. ................. 427/409 |
| 5,707,741 | A | * | 1/1998  | Hoenel et al. ............... 428/413 |

FOREIGN PATENT DOCUMENTS

EP       0 280 815 A2   12/1987

* cited by examiner

*Primary Examiner*—Ana Woodward
(74) *Attorney, Agent, or Firm*—Deborah M. Altman; Robert A. Diaz

(57) ABSTRACT

The present invention provides a reaction product having polyether carbamate groups formed from (A) polyoxyalkylene amine, and (B) cyclic carbonate, in an equivalents ratio ranging from 1:0.5 to 1:1.5. Further provided is a process for preparing the aforementioned reaction product. The present invention also is directed to an improved curable coating composition including (1) a reactive functional group-containing polymer, and (2) a curing agent having functional groups reactive with the functional groups of (1), the improvement being the inclusion in the coating composition the reaction product. Multilayer composite coatings including a first coating layer formed from the curable coating composition and a second coating layer over the curable coating composition are also provided, as well as coated substrates.

14 Claims, No Drawings

US 7,288,595 B2

POLYETHER CARBAMATE COMPOUNDS, COMPOSITIONS CONTAINING SUCH COMPOUNDS, AND METHODS RELATED THERETO

CROSS REFERENCE TO RELATED APPLICATIONS

This application is a divisional of U.S. patent application Ser. No. 10/028,839 now abandoned, filed Dec. 20, 2001, entitled "Polyether Carbamate Compounds, Compositions Containing Such Compounds, And Methods Related Thereto".

FIELD OF THE INVENTION

The present invention relates to polyether carbamate compounds formed from a polyoxyalkylene amine and a cyclic carbonate and to their use in curable compositions, particularly in curable coating compositions.

BACKGROUND OF THE INVENTION

Certain hydroxyalkyl carbamates and polymers prepared therefrom are known in the art. For example, U.S. Pat. Nos. 4,820,830 and 5,134,205 describe hydroxyalkyl carbamate compounds prepared by reacting cyclic carbonates, for example ethylene carbonate, propylene carbonate and butylene carbonate, with selected aliphatic diamines. The hydroxyalkyl carbamates are prepared without the use of any isocyanate intermediates and can be used in coating compositions in conjunction with a crosslinking agent such as a melamine-formaldehyde resin.

Also, beta-hydroxy urethane compounds (that is, urethane compounds having a hydroxyl group in the beta position relative to the carbamoxy group) are described in U.S. Pat. No. 4,435,559. These beta-hydroxy urethane compounds are prepared by reacting an isocyanate, for example, isophorone diisocyanate and 1,6-hexamethylene diisocyanate, with a 1,2-polyol, for example, 1,2-butanediol and 1,2-hexanediol, or a combination of a 1,2-polyol and a conventional blocking agent, such as a monoalcohol. The beta-hydroxy urethane compound is prepared under such conditions that virtually no free isocyanate groups are remaining in the resultant product. These beta-hydroxy urethane compounds are useful in curable compositions as a crosslinking agent in conjunction with other composition components, or in self-crosslinkable compositions.

U.S. Pat. No. 5,340,889 describes liquid hydroxy-urethane products having cyclocarbonate end groups prepared by reacting a polyoxyalkylenediamine with a molar excess of a bis-carbonate of a bis-glycidyl ether, for example the bis-glycidyl ether of neopentyl glycol. The bis-carbonate material is reacted with the polyoxyalkylenediamine in a molar ratio ranging from 5.0:1 to 2.0:1. This reaction ratio ensures that the resulting product has cyclocarbonate end groups. The reaction is conducted at a temperature ranging from ambient to 250° C. and at a pressure ranging from atmospheric up to 3000 psig.

Color-plus-clear coating systems involving the application of a colored or pigmented base coat to a substrate followed by application of a transparent or clear coat over at least a portion of the base coat have become increasingly popular as original finishes for a number of consumer products including, for example, automotive vehicles. The color-plus-clear coating systems have outstanding appearance properties such as gloss and distinctness of image, as well as excellent physical properties. Such color-plus-clear coating systems have become can be used advantageously in a variety of industrial applications including, for example automotive, aerospace, flooring and packaging applications.

Top coating systems, whether monocoats or the aforementioned color-plus-clear systems, particularly those used for automotive applications, are subject to various defects that can occur during the assembly process as well as from numerous environmental elements. On commercial automobile coating lines during application of the coating system, certain portions of the line can experience process problems. For example, the clear coat applicator might malfunction, or curing ovens can widely vary in temperature from the specification temperature. While the color coat typically is "flash cured" at a temperature sufficient to drive off solvent but not fully cure the coating, once the clear coating has been applied the color-plus-clear coating system typically is given a full bake (e.g., 250° F. (121° C.) for 30 minutes) to simultaneously cure both the base coat and the top coat. In instances where the clear coat application system is malfunctioning, the auto body with the applied color coat can continue through the clear coat applicator station and into the clear coat curing oven, thereby fully curing the color coat. If this occurs, some automobile manufacturers elect to reapply the color coat over the fully cured color coat prior to application of the clear coat. In such situations, the fully cured color coat can have poor intercoat adhesion with the subsequently applied color coat, even though the compositions may be the same.

Moreover, as discussed previously, during the assembly process, the applied color-plus-clear coating can include surface defects in the coating surface which require repair. Some automobile manufacturers elect to remove the defect and recoat the repair area with the same color-plus-clear system. In such instances, the color coating composition must be applied directly to the surface of a fully cured clear coat, followed by application of the clear coating composition over the color coating composition. It is known, however, that some clear coats when cured have poor intercoat adhesion with the subsequently applied repair color coat. This is believed to result due to the difference in surface energy of the cured clear coat and the subsequently applied repair color coating composition.

In recent years the trend in the automotive industry has been to reduce atmospheric pollution caused by the volatile solvents which are emitted during the painting process. One approach to emissions control has been the use of waterborne coating compositions as the pigmented or color coat in the color-plus-clear coating system.

U.S. Pat. Nos. 5,071,904 and 5,510,148 describe waterborne coating compositions useful for forming a base coat in color-plus-clear coating systems. The compositions comprise a polymeric film-forming resin comprising an aqueous dispersion of polymeric microparticles. The polymeric microparticles contain a substantially hydrophobic polymer which is essentially free of repeating acrylic or vinyl units in the backbone and is adapted to be chemically bound into the cured coating compositions. The remainder of the microparticle comprises an acrylic monomer or mixture of monomers. The hydrophobic polymer and the acrylic monomer(s) are particularized by high stress techniques followed by polymerization of the monomers to produce the polymeric microparticles which are stably dispersed in aqueous media.

Some waterborne coating compositions, however, are not without attendant disadvantages. For example, some waterborne coatings can have a narrow application window because it can be difficult to obtain smooth cured coatings, free of popping (described below), over a wide range of relative humidities. For example, in some instances, where the coating composition is applied in an environment having high relative humidity, water cannot readily evaporate from the applied film during the flash or dehydration period prior to curing at elevated temperatures.

Also, it has been noted that some waterborne coating compositions can increase in viscosity upon storage. Such a viscosity increase can occur for a number of reasons, for example, hydrogen bonding between various components and/or instability of rheology control additives such as associative thickeners. Such poor storage stability can necessitate the addition of water to adjust the application viscosity of the composition. This additional water decreases application resin solids of the composition, and can result in surface defects commonly referred to as "popping" which occur as water (and solvent if present) volatilizes through the coating surface upon curing.

In view of the foregoing it is desirable to provide waterborne coating compositions which have improved storage stability, excellent resistance to mottling and popping, good appearance properties, and acceptable adhesion properties.

SUMMARY OF THE INVENTION

In one embedment, the present invention is directed to a reaction product comprising polyether carbamate groups, the reaction product formed from (A) at least one polyoxyalkylene amine, and (B) at least one cyclic carbonate, wherein a ratio of equivalents of amine (A) to equivalents of cyclic carbonate (B) ranges from 1:0.5 to 1:1.5. The at least one polyoxyalkylene amine selected from the group consisting of polyoxyalkylene monoamine, polyoxyalkylene diamine, polyoxyalkylene triamine, and mixtures thereof, wherein the polyoxyalkylene diamine comprises a compound having the following structure (I):

where $R^1$, $R^2$, and $R^3$ can be the same or different and each independently represent a $C_2$ to $C_{12}$ alkylene group, and (n+m) represents a value greater than 2, provided that when $R^1$ and $R^3$ are different (n+m) represents a value greater than or equal to 2.

In a further embodiment, the present invention is directed to a reaction product comprising polyether carbamate groups, the reaction product formed from (A) at least one polyoxyalkylene amine, and (B) at least one cyclic carbonate selected from propylene carbonate, butylene carbonate, glycerine carbonate, and mixtures thereof, wherein a ratio of equivalents of amine (A) to equivalents of cyclic carbonate (B) ranges from 1:0.5 to 1:1.5.

In another embodiment, the present invention provides a reaction product prepared by the following steps: (a) admixing at least one cyclic carbonate and at least one polyetheramine selected from the group consisting of polyoxyalkylene monoamine, polyoxyalkylene diamine, polyoxyalkylene triamine, and mixtures thereof, wherein the polyoxyalkylene diamine comprises a compound having the structure (I) where $R^1$, $R^2$, and $R^3$, and and (n+m) are as described above for that structure; optionally, in the presence of an alkoxide catalyst, to form a reaction mixture such that the ratio of equivalents of amine to equivalents of cyclic carbonate is 1:0.5 to 1:1.5; and (b) maintaining the reaction mixture of step (a) at a temperature ranging from ambient temperature to 150° C. at atmospheric pressure for a period of time sufficient to drive the reaction to 80 percent of theoretical completion.

In a further embodiment, the present invention is directed to an improved curable coating composition comprising (1) a reactive functional group-containing polymer, and (2) a curing agent having functional groups reactive with the functional groups of (1). The improvement comprises the inclusion in the coating composition of (3) the at least one reaction product of (A) at least one polyoxyalkylene amine selected from the group consisting of polyoxyalkylene monoamine, polyoxyalkylene diamine, polyoxyalkylene triamine, and mixtures thereof, wherein the polyoxyalkylene diamine comprises a compound having the structure (!) as described above, and (B) at least one cyclic carbonate, wherein a ratio of equivalents of amine (A) to equivalents of cyclic carbonate (B) ranges from 1:0.5 to 1:1.5.

The present invention also provides an improved multi-layer composite coating comprising a first coating layer deposited over at least a portion of a substrate from a first curable coating composition, and a second coating layer deposited over at least a portion of the first coating layer, the second coating layer formed from a second curable coating composition. The first curable coating composition comprises (1) a reactive functional group-containing polymer, and (2) a curing agent having functional groups reactive with the functional groups of (1). The improvement comprises the inclusion in the first curable coating composition of the at least one reaction product (3) as described above with respect to the curable coating composition of the present invention.

Additionally, the present invention provides a substrate comprising a substrate and a cured coating layer over at least a portion of the substrate formed from any of the previously described curable coating compositions.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of 1" to 10" is intended to include all sub-ranges between and including the recited minimum value of 1 and the recited maximum value of 10, that is, having a minimum value equal to or greater than 1 and a maximum value of equal to or less than 10.

As mentioned above, in one embodiment, the present invention is directed to a reaction product comprising polyether carbamate groups. The reaction product can be formed from (A) at least one polyoxyalkylene amine, and (B) at least one cyclic carbonate.

The polyoxyalkylene amine (A) can include polyoxyalkylene monoamines, and polyoxyalkylene polyamines, for example, polyoxyalkylene diamine and polyoxyalkylene triamine. In one embodiment of the present invention, the polyoxyalkylene amine is selected from the group consisting of polyoxyalkylene monoamine, polyoxyalkylene diamine, polyoxyalkylene triamine, and mixtures thereof. As used herein, by "polyoxyalkylene polyamine" is meant a polyamine containing both oxyalkylene groups and at least two amine groups, typically primary amine groups, per molecule.

In one embodiment of the present invention, the polyoxyalkylene amine comprises a polyoxyalkylene diamine represented by the following structure (I):

wherein $R^1$, $R^2$, and $R^3$ can be the same or different and each independently represents a $C_2$ to $C_{12}$, typically a $C_2$ to $C_4$, alkylene groups and (n+m) represents a value greater than 2 and up to 200, provided that when $R^1$ and $R^3$ are different, (n+m) represents a value equal to or greater than 2 and up to 200. In one embodiment, (n+m) represents a value ranging from 3 to 50, usually from 5 to 35 and typically from 5 to 12.

By "alkylene" is meant acyclic or cyclic alkylene groups having a carbon chain length of from $C_2$ to $C_{25}$, typically $C_2$ to $C_{12}$ which may be substituted or unsubstituted, and which may include substituents, for example, lower alkyl radicals having from 1 to 12 carbon atoms. In a particular embodiment of the present invention, $R^1$, $R^2$, and $R^3$ can be the same or different and each independently represents an alkylene group selected from ethylene, propylene, butylene, and mixtures thereof. For purposes of the present invention, "propylene" groups are intended to include both n-propylene and isopropylene groups; and, likewise, "butylene" groups are intended to include both n-butylene, isobutylene, and t-butylene groups.

Moreover, the structure (I) above is diagrammatic only and is not intended to imply that the parenthetical portions thereof are necessarily blocks, although blocks may be used where desired. For example, the polymer represented by the structure (I) may be a random copolymer of —[$R^1$—O]— and —[$R^3$—O]—, a homopolymer of either —[$R^1$—O]— or —[$R^3$—O]—, or a block copolymer of —[$R^1$—O]— and —[$R^3$—O]—.

Specific non-limiting examples of polyoxyalkylene amines which are suitable for use in forming the polyether carbamate group-containing reaction products of the present invention include polyoxyalkylene polyamines, such as the polyoxypropylene diamines commercially available under the tradenames JEFFAMINE® D-2000 and JEFFAMINE® D-400, commercially available from Huntsman Corporation of Houston, Tex. A variety of other suitable polyoxyalkylene amines are described in detail in U.S. Pat. No. 3,236,895, column 2, lines 40 to 72; methods of preparation of the polyoxyalkylene amines are illustrated in the patent in Examples 4, 5, 6 and 8-12 in columns 4 to 9 thereof, the aforementioned portions of U.S. Pat. No. 3,236,895 hereby being incorporated by reference herein.

Mixed polyoxyalkylene polyamines, that is, those in which the oxyalkylene group can be selected from more than one moiety, also can be used advantageously. Suitable examples of such mixed polyoxyalkylene polyamines include polyoxyethylene-polyoxypropylene polyamines.

Besides the polyoxyalkylene amines mentioned above, derivatives of polyoxyalkylene polyols can also be used. Examples of suitable derivatives include aminoalkylene derivatives which are prepared by reacting polyoxyalkylene polyols as are well known in the art with acrylonitrile followed by hydrogenation of the reaction product in an art recognized manner. Exemplary of such derivatives is polytetramethylene glycol bis(3-aminopropyl(ether)).

In one embodiment of the present invention, $R^1$, $R^2$, and $R^3$ can be the same or different and each independently represents an alkylene group selected from ethylene and isopropylene, and (n+m) represents a value greater than 2, provided that when $R^1$ and $R^3$ are different, (n+m) is equal to or greater than 2. Typically, $R^1$, $R^2$, and $R^3$, which can be the same or different, each independently represents an alkylene group selected from ethylene and isopropylene, and the value represented by (n+m) satisfies the condition $5 \leq (n+m) \leq 6$.

In an alternative embodiment of the present invention, the polyoxyalkylene amine comprises a polyoxyalkylene triamine represented by the following structures (II) or (III):

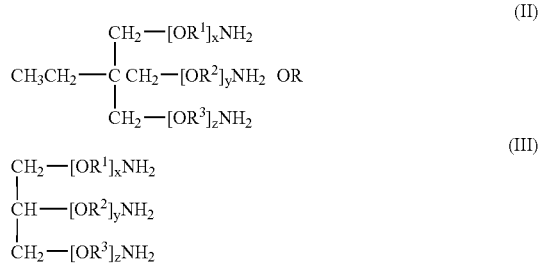

wherein $R^1$, $R^2$, and $R^3$ independently can be the same or different and each independently represents a moiety selected from ethylene, propylene, and butylene; and x, y, and z independently can be the same or different, and each independently represents a value greater than or equal to 1.

The cyclic carbonate (B) used to form the polyether carbamate group-containing reaction product of the present invention can be selected from any of a variety of cyclic carbonates well known in the art. Suitable non-limiting examples include cyclic carbonates selected from the group consisting of ethylene carbonate, propylene carbonate, butylene carbonate, glycerine carbonate, a di(cyclic carbonate) compound represented by the following structure (IV), and mixtures thereof:

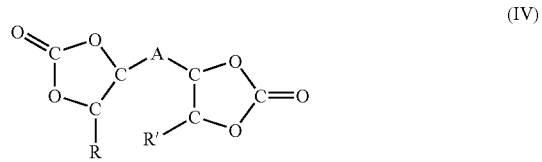

wherein R and R' may independently represent H, $CH_3$, or $CH_2OH$, and A represents an organic divalent group. The organic divalent group can represent, for example, a cyclic or acyclic, substituted or unsubstituted alkylene group, oxyalkylene group, aralkylene or alkylene aryl group. By "oxyalkylene" is meant an alkylene group containing one or more other oxygen atoms. By "aralkylene" is meant a divalent aromatic group, which may be ring-substituted. By "alkylene aryl" is meant any acyclic alkylene group containing at least one aryl group, for example phenyl.

Typically, the cyclic carbonate (B) is selected from at least one of ethylene carbonate, propylene carbonate, and butylene carbonate.

The polyether carbamate group-containing reaction product of the present invention typically is prepared by admixing the polyoxyalkylene amine (A) and the cyclic carbonate (B) as described above, optionally, in the presence of an alkoxide catalyst, for example potassium tertiary butoxide to form a reaction mixture such that the ratio of equivalents of amine of (A) to equivalents of carbonate of (B) ranges from 1:0.5 to 1:1.5, usually from 1:0.8 to 1:1.1, and typically from 1:0.9 to 1:1.1; and heating the reaction mixture to a temperature ranging from ambient temperature to 150° C., can be from 50° C. to 150° C., typically from 90° C. to 140° C. at atmospheric pressure for a period of time sufficient to drive the reaction to 80 percent, typically 90 percent, of theoretical completion. It should be understood that lower temperature can be used if the reaction is conducted at higher pressured. By "theoretical completion" is meant complete consumption of the reactant which is present in the least amount on an equivalence basis.

Also, it should be understood that the polyether carbamate group-containing reaction product can contain the reaction product of the polyoxyalkylene amine (A) and the cyclic carbonate (B), as well as any residual unreacted polyoxyalkylene amine (A), any residual unreacted cyclic carbonate (B), and any rearrangement products of the starting materials (A) and (B).

In any event, the reactants (A) and (B) are reacted in amounts and under conditions such that at least a portion of, and typically, substantially all, of the resulting reaction product is hydroxy-terminated.

As previously discussed, the present invention also is directed to an improved curable composition, preferably a curable coating composition, comprising (1) a reactive functional group-containing polymer, and (2) a curing agent having functional groups reactive with the functional groups of (1). The improvement comprises the inclusion in the coating composition of (3) at least one polyether carbamate group-containing reaction product as described in detail above.

The reaction product containing polyether carbamate groups (3) can be present in the curable coating composition of the present invention in an amount of at least 1 percent by weight, often at least 5 percent by weight and typically at least 10 percent by weight resin solids based on total weight of resin solids present in the composition. Also, the reaction products (3) can be present in the curable coating composition of the present invention in an amount less than or equal to 50 percent by weight, often 25 percent by weight, and typically 20 percent by weight resin solids, based on total weight of resin solids present in the curable composition. The amount of the reaction product (3) present in the curable coating composition of the present invention can range between any combination of these values inclusive of the recited values.

As used herein, the term "cure" as used in connection with a composition, e.g., "a curable composition," shall mean that at least a portion of the curable or crosslinkable components which form the composition are capable of forming an at least partially crosslinked network. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen such as is described above. This method determines the glass transition temperature and crosslink density of free films of coatings or polymers. These physical properties of a cured material are related to the structure of the crosslinked network.

Also, as used herein, the term "polymer" is intended to included oligomers as well as polymers, and homopolymers, that is polymers formed from one polymerizable species, as well as heteropolymers, that is polymers formed from at least two different polymerizable species.

The reactive functional group-containing polymer (1) can be any of a variety of polymers well known in the art. For example, the polymer (1) can be selected from at least one of polyether polymers, polyester polymers, acrylic polymers, silicon-based polymers, polyepoxide polymers, and polyurethane polymers. Mixtures of any of the foregoing polymers can be used.

In a particular embodiment of the present invention, the polymer (1) can comprise at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group. Combinations of any of the foregoing reactive functional groups can comprise the polymer (1).

In another embodiment of the present invention, the film-forming polymer (1) comprises at least one reactive functional group selected from a hydroxyl group, a carbamate group, an epoxy group, an isocyanate group, and a carboxyl group. In another embodiment, the polymer (1) comprises at least one reactive functional group selected from a hydroxyl group, and a carboxyl group.

Suitable hydroxyl group-containing polymers can include acrylic polyols, polyester polyols, polyurethane polyols, polyether polyols, and mixtures thereof. In a particular embodiment of the present invention, the film-forming polymer is an acrylic polyol having a hydroxyl equivalent weight ranging from 50 to 4000 grams per solid equivalent, typically 50 to 500 grams per solid equivalent.

Suitable hydroxyl group and/or carboxyl group-containing acrylic polymers can be prepared from polymerizable ethylenically unsaturated monomers and are typically copolymers of (meth)acrylic acid and/or hydroxyalkyl esters of (meth)acrylic acid with one or more other polymerizable ethylenically unsaturated monomers such as alkyl esters of (meth)acrylic acid including methyl(meth)acrylate, ethyl(meth)acrylate, butyl(meth)acrylate and 2-ethyl hexylacrylate, and vinyl aromatic compounds such as styrene, alpha-methyl styrene, and vinyl toluene. As used herein, "(meth)acrylate" and like terms is intended to include both acrylates (derived from acrylic acid) and methacrylates (derived from methacrylic acid).

The acrylic polymer also can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl(meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The acrylic polymers can be prepared by solution polymerization techniques, which are well-known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the coating compositions of the invention as the film-forming polymer. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (1) in the curable compositions of the present invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No.4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic lo diisocyanates, such as 1,4-cyclohexyl diisocyanate and isophorone diisocyanate also can be employed.

Examples of suitable polyether polyols include polyalkylene ether polyols such as those having the following structural formulas:

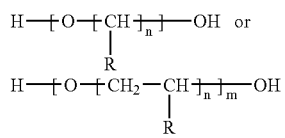

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene)glycols, poly(oxytetraethylene)glycols, poly(oxy-1,2-propylene)glycols, and poly(oxy-1,2-butylene)glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE® and TERACOL®, available from E. I. DuPont de Nemours and Company.

Hydroxyl functional group-containing polymers typically are employed.

Polyepoxides such as those described below with reference to the curing agent (B), can also be used.

The polymer (1) having reactive functional groups can be present in the curable compositions in an amount of at least 2 percent by weight, usually at least 5 percent by weight, and typically at least 10 percent by weight resin solids based on weight of total resin solids in the coating composition. Also, the polymer (1) having reactive functional groups can be present in the thermosetting compositions of the invention in an amount less than 95 percent by weight, usually less than 90 percent by weight, and typically less than 85 percent by weight based on weight of total resin solids in the coating composition. The amount of the polymer (1) having reactive functional groups present in the compositions of the present invention can range between any combination of these values inclusive of the recited values.

As aforementioned, in addition to the functional group-containing film-forming polymer (1) and the polyether carbamate group-containing reaction product (3), the curable composition of the present invention further comprises at least one curing agent (2) having functional groups reactive with the functional groups of the polymer (1).

Dependent upon the reactive functional groups of the polymer (1), the curing agent (2) can be selected from an aminoplast resin, a polyisocyanate, a blocked isocyanate, a polyepoxide, a polyacid, an anhydride, an amine, a polyol, and mixtures of any of the foregoing. In one embodiment, the at least one curing agent (2) is selected from an aminoplast resin and a polyisocyanate.

In another embodiment, the present invention is directed to any composition as previously described wherein the curing agent comprises an aminoplast resin. Aminoplast resins, which can comprise phenoplasts, as curing agents for hydroxyl, carboxylic acid, and carbamate functional group-containing materials are well known in the art. Suitable aminoplast resins, such as, for example, those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast resin contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment of the present invention, the curing agent comprises an aminoplast resin which, when added to the other components that form the thermosetting composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the composition.

In yet another embodiment of the present invention, the curing agent (2) comprises a polyisocyanate curing agent. As used herein, the term "polyisocyanate" is intended to include blocked (or capped) isocyanates as well as unblocked (poly)isocyanates. The polyisocyanate can be an aliphatic or an aromatic polyisocyanate, or a mixture of the two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components which form the coating composition, in an amount ranging from 5 to 65 weight percent, can be present in an amount ranging from 10 to 45 weight percent, and often are present in an amount ranging from 15 to 40 percent by weight based on the total weight of resin solids present in the composition.

Other useful curing agents comprise other blocked isocyanate compounds such as, for example, the tricarbamoyl triazine compounds described in detail in U.S. Pat. No. 5,084,541, which is incorporated by reference herein. When used, the blocked polyisocyante curing agent can be present, when added to the other components in the composition, in an amount ranging up to 20 weight percent, and can be present in an amount ranging from 1 to 20 weight percent, based on the total weight of resin solids present in the composition.

In one embodiment of the present invention, the curing agent comprises both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alpha-methyl styrene, vinyl toluene, and the like. Nonlimiting examples of suitable ethylenically unsaturated carboxylic acid anhydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16-50;

and in U.S. Pat. No. 4,732,790 at column 3, lines 41-57, both of which are incorporated herein by reference.

Polyepoxides as curing agents for carboxylic acid functional group-containing materials are well known in the art. Nonlimiting examples of polyepoxides suitable for use in the compositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule, different from component (1) when component (1) is a polyol. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When desired, appropriate mixtures of curing agents may be used. It should be mentioned that the compositions can be formulated as a one-component composition where a curing agent such as an aminoplast resin and/or a blocked isocyanate compound such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

The curable coating compositions of the present invention can be water-based compositions, solvent-based compositions, or compositions in solid particulate form, e.g., a powder coating composition. Typically, the curable coating composition is a water-based composition.

In one particular embodiment of the present invention, the reactive functional group-containing polymer (1) is dispersed in an aqueous medium and comprises an aqueous dispersion of polymeric microparticles. The microparticles can be crosslinked. A wide range of crosslinked polymeric microparticle dispersions are suitable for use herein including those described in U.S. Pat. No. 4,403,003 and references cited therein. In a particular embodiment, the microparticles contain greater than 30 percent by weight based on the microparticles of a substantially hydrophobic polymer having a molecular weight of greater than 300. Usually, the microparticles contain greater than 40 percent by weight of the substantially hydrophobic polymer, more preferably greater than 50 percent.

By "substantially hydrophobic" is meant that upon mixing a sample of polymer with an organic component and water, a majority of the polymer is in the organic phase and a separate aqueous phase is observed. Examples of suitable substantially hydrophobic polymers include polyester, polyurethane, polyether and alkyd polymers such as those discussed in detail above (provided, of course, that such polymers are substantially hydrophobic), which are substantially free of repeating acrylic or vinyl units in the backbone.

Also, it should be understood that the substantially hydrophobic polymer is adapted to be chemically bound into the cured coating composition. That is, the polymer is reactive in the sense that it contains functional groups such as hydroxyl groups which are capable of co-reacting, for example, with a crosslinking agent, such as a melamine formaldehyde resin, which may be present in the coating composition or, alternatively, with other film forming resins which also may be utilized. The hydrophobic polymer can have a molecular weight greater than 300, often greater than 500, and typically greater than 800. Usually, the number average molecular weight ranges from 300 to 10,000, more often from 300 to 5,000.

As was mentioned above, the polyester, polyurethane, alkyd and polyether polymers described above are examples of suitable substantially hydrophobic polymers. The polyester resins contain essentially no oil or fatty acid modification. That is, while alkyd resins are in the broadest sense polyester type resins, they are oil-modified and thus not generally referred to as polyester resins. The polyesters are of two kinds. One type are the unsaturated polyesters derived from unsaturated polyfunctional acids and polyhydric alcohols. Maleic acid and fumaric acid are the usual unsaturated acid components although methacrylic acid unsaturated alcohols such as trimethylolpropane mono- or diallyl esters can also be used. Commonly used polyhydric alcohols are 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol and sorbitol. Often times a saturated acid will be included in the reaction to provide desirable properties. Examples of saturated acids include phthalic acid, isophthalic acid, adipic acid, azeleic acid, sebacic acid, and the anhydrides thereof. The saturated polyesters are derived from saturated or aromatic polyfunctional acids, preferably dicarboxylic acids, and mixtures of polyhydric alcohols having an average hydroxyl functionality of at least 2. Other components of polyesters can include hydroxy acid and lactones such as ricinoleic acids, 12-hydroxystearic acid, caprolactone, butyrolactone and dimethylolopropionic acid.

The alkyds are polyesters of polyhydroxyl alcohols and polycarboxylic acids chemically combined with various drying, semi-drying and non-drying oils in different proportions. Thus, for example, the alkyd resins are made from polycarboxylic acids such as phthalic acid, maleic acid, fumaric acid, isophthalic acid, succinic acid, adipic acid, azeleic acid, sebacic acid as well as from anhydrides of such acids, where they exist. The polyhydric alcohols which can be reacted with the polycarboxylic acid include 1,4-butanediol, 1,6-hexanediol, neopentyl glycol, ethylene glycol, diethylene glycol and 2,3-butylene glycol, glycerol, trimethylolpropane, trimethylolpropane, pentaerythritol, sorbitol and mannitol.

The alkyd resins are produced by reacting the polycarboxylic acid and the polyhydric alcohols together with a drying, semi-drying or non-drying oil in proportions depending upon the properties desired. The oils are coupled into the resin molecule by esterification during the manufacturing and become an integral part of the polymer. The oil is fully saturated or predominately unsaturated. When cast into films, the fully saturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well known in the art.

Examples of polyether polyols are polyalkylene ether polyols such as those described above. With polyether polyols, it is preferred that the carbon to oxygen weight ratio be high for better hydrophobic properties. This it is preferred that the carbon to oxygen ratio be greater than 3/1 and more preferably greater than 4/1.

The polyurethane polymers can be any of those described above provided they are sufficiently substantially hydrophobic. Examples of suitable polyurethane polymers also are described in detail in U.S. Pat. No. 5,071,904 at column 4, lines 30 to 62 incorporated by reference herein.

The balance of the microparticle typically comprises an ethylenically unsaturated monomer or a mixture of ethylenically unsaturated monomers. These monomers hereinafter are referred to as "polymerizable species". Examples of suitable materials include acrylic monomers, for example alkyl esters of (meth)acrylic acid, as well as vinyl aromatic monomers, for example styrene. Examples of suitable ethylenically unsaturated monomers for this purpose can be found in U.S. Pat. No. 5,071,904 at column 4, line 63 to column 5, line 11 incorporated by reference herein. The hydrophobic polymer is substantially insoluble in the aqueous medium and is also capable of being dissolved in the monomer or monomer mixture which is utilized to prepare the polymer which comprises the balance of the microparticle.

The dispersion of polymeric microparticles in an aqueous medium is typically prepared by a high stress technique which is described more fully below. First, the acrylic monomer or mixture of such monomers utilized to prepare the polymer which comprises the balance of the microparticle is thoroughly mixed with the aqueous medium and the substantially hydrophobic polymer. For the present application, the ethylenically unsaturated monomer or mixture of such monomers together with the substantially hydrophobic polymer is referred to as the "organic component". The organic components generally also comprise other organic species and usually is substantially free of organic solvent. That is, no more than 20 percent of organic solvent is present. The mixture is then subjected to stress in order to particulate it into microparticles which are uniformly of a fine particle size. The mixture is submitted to stress sufficient to result in a dispersion such that after polymerization less than 20 percent of the polymer microparticles have a mean diameter greater than 5 microns.

The aqueous medium provides the continuous phase of dispersion in which the microparticles are suspended. The aqueous medium is generally exclusively water. However, for some polymer systems, it may be desirable to also include a minor amount of inert organic solvent which can assist in lowering the viscosity of the polymer to be dispersed. For example, if the organic phase has a Brookfield viscosity greater than 1000 centipoise at 25° C. or a Gardner-Holdt bubble viscosity of "W", the use of some solvent may be desirable. For some applications of the aqueous microparticle dispersion, for example, in its present use as a resinous binder for coating compositions, it may be desirable to include a coalescing solvent in the coating composition. One can conveniently include this coalescing solvent during the synthesis of the polymer or in the latex as part of the organic component. Examples of suitable water insoluble solvents which can be incorporated in the organic component are benzyl alcohol, xylene, methyl isobutyl ketone, mineral spirits, butanol, butyl acetate, tributyl phosphate and dibutyl phthalate.

As was mentioned above, the mixture typically is subjected to the appropriate stress by use of a MICROFLUIDIZER® emulsifier which is available from Microfluidics Corporation in Newton, Mass. The MICROFLUIDIZER high pressure impingement emulsifier is described in detail in U.S. Pat. No. 4,533,254. The device consists of a high pressure (up to 20,000 psi) pump and an interaction chamber where the emulsification takes place. The pump forces the mixture of reactants in aqueous medium into the chamber where it is split into at least two streams which pass at very high velocity through at least two slits and collide resulting in the particulation of the mixture into small particles. Generally, the reaction mixture passed through the emulsifier once at a pressure between 5,000 and 15,000 psi. Multiple passes can result in smaller average particle size and a narrower range for the particle size distribution. When using the aforesaid MICROFLUIDIZER emulsifier, stress is applied by liquid-liquid impingement as has been described. However, it should be understood that if desired, other modes of applying stress to the pre-emulsification mixture can be utilized so long as sufficient stress is applied to achieve the requisite particle size distribution, that is, such that after polymerization less than 20 percent of the polymer microparticles have a mean diameter greater than 5 microns. For example, one alternative manner of applying stress would be the use of ultrasonic energy.

Stress is described as force per unit area. Although the precise mechanism by which the MICROFLUIDIZER emulsifier stresses the pre-emulsification mixture to particulate it is not thoroughly understood. It is theorized that stress is exerted in more than one manner. It is believed that one manner in which stress is exerted is by shear. Shear means that the force is such that one layer or plane moves parallel to an adjacent, parallel plane. Stress can also be exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it is believed that both shear and cavitation contribute to producing the stress which particulates the preemulsification mixture.

Once the mixture has been particulated into microparticles, the polymerizable species within each particle are polymerized under conditions sufficient to produce polymer microparticles which are stably dispersed in the aqueous medium. It should be understood that one of the requisite conditions sufficient to achieve the stably dispersed microparticles is the presence in the reaction mixture of a surfactant which is also termed a dispersant. The surfactant is preferably present when the organic component referred to above is mixed into the aqueous medium, prior to particularion. Alternatively, the surfactant can be introduced into the medium at a point just after the particularion within the MICROFLUIDIZER emulsifier. The surfactant, however, can be an important part of the particle forming process and can be necessary to achieve the requisite dispersion stability. The surfactant can be a material that serves to prevent the emulsified particles from agglomerating to form larger particles.

The same surfactants or dispersants which can be utilized during conventional emulsion polymerization are also suitable for this high stress technique. Examples of suitable surfactants include the dimethylethanolamine salt of dodecylbenzenesulfonic acid, sodium dioctylsulfosuccinate, ethoxylated nonylphenol and sodium dodecyl benzene sulfonate. Other materials well known to those skilled in the art are also suitable herein. Generally, both ionic and nonionic surfactants are used together and the amount of surfactant ranges from about 1 percent to about 10 percent, preferably from about 2 percent to about 4 percent, the percentage based on the total solids. One particularly preferred surfactant for the preparation of aminoplast curable dispersions is the dimethylethanolamine salt of dodecylbenzenesulfonic acid.

In order to conduct the free radical polymerization of the polymerizable species, a free radical initiator typically is also required. Both water soluble and oil soluble initiators can be used. Since the addition of certain initiators, such as redox initiators, can result in a strong exothermic reaction, it is generally desirable to add the initiator to the other ingredients immediately before the reaction is to be conducted. Examples of water soluble initiators include ammonium peroxydisulfate, potassium peroxydisulfate and hydrogen peroxide. Examples of oil soluble initiators include t-butyl perbenzoate and 2,2'-azobis(isobutyronitrile). Preferably redox initiators such as ammonium peroxydisulfate/sodium metabisulfite or t-butylhydroperoxide/isoascorbic acid are utilized herein.

It should be understood that in some instances it may be desirable for some of the reactant species to be added after particulation of the remaining reactants and the aqueous medium (for example, water soluble acrylic monomers such as hydroxypropyl methacrylate). The particulated mixture is then subjected to conditions sufficient to induce polymerization of the polymerizable species, within the microparticles. The particular conditions will vary depending upon the actual materials being polymerized. The length of time required to complete polymerization typically varies from about 10 minutes to about 6 hours. The progress of the polymerization reaction can be followed by techniques conventionally known to those skilled in the art of polymer chemistry. For example, heat generation, monomer concentration and percent of total solids are all methods of monitoring the progress of the polymerization.

The aqueous microparticle dispersions can be prepared by a batch process or a continuous process. In one batch process the unreacted microdispersion is fed over a period of about 1 to 4 hours into a heated reactor initially charged with water. The initiator can be fed in simultaneously, it can be part of the microdispersion or it can be charged to the reactor before feeding in the microdispersion. The optimum temperature depends upon the specific initiator being used. The length of time typically ranges from about 2 hours to about 6 hours.

In an alternative batch process, a reactor vessel is charged with the entire amount of microdispersion to be polymerized. Polymerization commences when an appropriate initiator such as a redox initiator is added. An appropriate initial temperature is chosen such that the heat of polymerization does not increase the batch temperature beyond the boiling point of the ingredients. Thus for large scale production, it is preferred that the microdispersion have sufficient heat capacity to absorb the total amount of heat being generated.

In a continuous process the pre-emulsion or mixture of raw materials is passed through the homogenizer to make a microdispersion which is immediately passed through a heated tube, e.g., stainless steel, or a heat exchanger in which polymerization takes place. The initiator is added to the microdispersion just before it enters the tubing.

It is preferred to use redox type initiators in the continuous process since other initiators can produce gases such as nitrogen or carbon dioxide which can cause the latex to spurt out of the reaction tubing prematurely. The temperature of reaction can range from about 25° C. to about 80° C., preferably about 35° C. to about 45° C. The residence time typically ranges from about 5 minutes to about 30 minutes.

The tubing in which the reaction occurs is not required to heat the microdispersion but rather to remove the heat being generated. Once the initiator has been added, the reaction begins spontaneously after a short induction period and the reaction exotherm resulting from the polymerization will rapidly raise the temperature.

If there is still free or unreacted monomer remaining after all of the initiator is consumed, an additional amount of initiator can be added to scavenge the remaining monomer.

Once the polymerization is complete, the resultant product is a stable dispersion of polymer microparticles in an aqueous medium, wherein both the polymer formed from the polymerizable species and the substantially hydrophobic polymer are contained within each microparticle. The aqueous medium, therefore, is substantially free of water soluble polymer. The resultant polymer microparticles are of course insoluble in the aqueous medium. In saying that the aqueous medium is substantially free of water soluble polymer, it is intended that the term "substantially free" means that the aqueous medium contains no more than 30 percent, often no more than 15 percent and typically no more than 10 percent by weight of dissolved polymer.

By "stably dispersed" is meant that the polymer microparticles do not hard settle upon standing and do not coagulate or flocculate upon standing. Typically, when diluted to 50 percent total solids the microparticle dispersions do not settle even when aged for one month at room temperature.

As was stated above, a very important aspect of the polymer microparticle dispersions is that the particle size is uniformly small, i.e., after polymerization less than 20 percent of the polymer microparticles have a mean diameter which is greater than 5 microns, more preferably greater than 1 micron. Generally, the microparticles have a mean diameter from about 0.01 microns to about 10 microns. Preferably the mean diameter of the particles after polymerization ranges from about 0.05 microns to about 0.5 microns. The particle size can be measured with a particle size analyzer such as the Coulter N4 instrument commercially available from Coulter. The instrument comes with detailed instructions for making the particle size measurement. However, briefly, a sample of the aqueous dispersion is diluted with water until the sample concentration falls within specified limits required by the instrument. The measurement time is 10 minutes.

The microparticle dispersions are high solids materials of low viscosity. Dispersions can be prepared directly with a total solids content of from about 45 percent to about 60 percent. They can also be prepared at a lower solids lever of about 30 to about 40 percent total solids and concentrated to a higher level of solids of about 55 to about 65 percent by stripping. The molecular weight of the polymer and viscosity of the aqueous dispersions are independent of each other. The weight average molecular weight can range from few hundred to greater than 100,000. The Brookfield viscosity can also vary widely from about 0.01 poise to about 100 poise, depending on the solids and composition, preferably from about 0.2 to about 5 poise when measured at 25° C. using an appropriate spindle at 50 RPM.

The microparticle dispersion can be either crosslinked or uncrosslinked. When uncrosslinked the polymer within the microparticle can be either linear or branched.

The curable coating compositions of the present invention can contain, in addition to the components described above, a variety of other optional materials. As was mentioned above, if desired, other resinous materials can be utilized in conjunction with the dispersion of polymeric microparticles so long as the resultant coating composition is not detrimentally affected in terms of physical performance and properties. In addition, material such as rheology control agents, ultraviolet light stabilizers, catalysts, fillers and the like can be present.

In one embodiment, the present invention is directed to a curable coating composition such as any of the previously described curable coating compositions, wherein the reaction product (3) is present in an amount sufficient to provide viscosity stability of the composition such that the viscosity of the composition, typically as determined in accordance with ASTM D1200-99, increases not more than 50%, usually not more than 35%, and typically not more than 20%, upon storage for 16 hours at a temperature ranging from 49° C. to 71° C.

The curable composition of the present invention can be a substantially pigment-free composition, for example, a clear coat in a color-plus-clear system, or, alternatively, a pigment-containing composition, for example a monocoat or a basecoat in a color-plus-clear system. The pigments which can be utilized are of various types, depending upon whether a metallic pigment is desired. When a metallic coating is desired preferably aluminum flake is utilized. A variety of grades of aluminum flake are available such as Silberline Sparkle Silver 5000 AR, Toyo 8260 and Obron OBT 8167 STAPA M. Also chrome treated aluminum flake such as Hydrolux 400 and Ekkert 47700 can be used. Other metallic pigments include bronze flakes, coated mica, nickel flakes, tin flakes, silver flakes, copper flakes, or combination of these. Other examples of suitable pigments include mica, iron oxides, lead oxides, carbon black, titanium dioxide, talc, as well as a variety of color pigments. The specific pigment to binder ratio can vary widely so long as it provides the requisite hiding at the desired film thickness and application solids.

The curable coating compositions can be applied by conventional means including brushing, dipping, flow coating, spraying and the like, but they are most often applied by spraying. Conventionally known spray techniques and equipment for air spraying and electrostatic spraying and either manual or automatic methods can be used.

In one embodiment, the present invention is directed to an improved multilayer composite coating comprising a first coating layer deposited over at least a portion of a substrate from a first curable coating composition, and a second coating layer deposited over at least a portion of the first coating layer, the second coating layer formed from a second curable coating composition. The first coating layer, for example, a base coat in a color-plus-clear system, can be formed from any of the previously described curable coating compositions of the present invention.

During application of the first curable coating composition to the substrate, a first coating layer is formed over at least a portion of the substrate. Typically, the first coating layer dry film thickness will range from 0.01 to 5 mils (0.25 to 127 micrometers), and typically 0.1 to 2 mils (2.5 to 51 micrometers) in thickness.

As mentioned above, after application of the first curable coating composition, a film is formed on at least a portion of the surface of the substrate. This is achieved by driving solvent. i.e., organic solvent and/or water, out of the film by heating or simply by an air-drying period. Preferably, the heating step will be for a period sufficient to ensure that the second curable coating composition can be applied to the first coating layer without dissolving the first coating layer i.e., "striking in".

Suitable drying conditions will depend on the particular first coating composition, on the ambient humidity with certain waterbased compositions, but in general, a drying time of from 1 to 5 minutes at a temperature of 100° to 250° F. (390 to 121° C.) will be adequate to ensure that mixing of the two coats is minimized. At the same time, the first coating layer is adequately wetted by the second coating composition so that satisfactory intercoat adhesion is obtained.

The multilayer composite coating is characterized in that the reaction product (3) is present in the first coating composition in an amount sufficient to provide at least 50%, usually at least 75%, and typically at least 80% adhesion between the coating and the substrate as determined by ASTM-D3359-97. Also, it should be understood that as used herein, a coating layer or composition formed "over" at least a portion of a "substrate" refers to a coating layer or composition formed directly on at least a portion of the substrate surface, as well as to a coating layer or composition formed over any coating or adhesion promoter material which was previously applied to at least a portion of the substrate.

That is, the "substrate" upon which the first coating layer is formed can comprise a metallic or elastomeric substrate to which one or more coating layers have been previously applied. For example, the "substrate" can comprise a metallic substrate and a weldable primer coating over at least a portion of the substrate surface, and the first polymeric layer can comprise an electrodepositable primer coating. Likewise, the "substrate" can comprise a metallic substrate having an electrodepositable primer formed over at least a portion thereof, and a primer-surfacer coating over at least a portion of the electrodepositable primer. The first coating layer of the multilayer composite coating of the present invention can comprise, for example, a pigmented base coat over at least a portion of this multli-layer "substrate", and the second coating layer can comprise a pigment-free top coat formed over at least a portion of the pigmented base coat.

Also, more than one first coating and multiple second coating compositions may be applied to develop the optimum appearance. Usually between coats, the previously applied coating is flashed, that is, exposed to ambient conditions for about 1 to 20 minutes. The second coating composition can be applied to the coated substrate by any of the conventional coating techniques described above in connection with the first coating, however spray applications tend to give the best appearance properties.

After application of the second coating composition to the first coating layer, the coated substrate is heated to cure the coating layers. The heating or curing operation is usually carried out at a temperature in the range of from 160° to 350° F. (71° to 177° C.), but if needed lower or higher temperatures may be used depending upon whether it is sufficient to activate any necessary crosslinking mechanisms. It should be understood that for the purposes of the present invention the term "curing" also includes drying.

The dry film thickness of the second coating layer can range from 0.5 to 5 mils (12.7 to 127.0 micrometers), and typically from 1.2 to 3 mils (30.5 to 76.2 micrometers).

As mentioned above, the present invention is also directed to a coated substrate comprising a substrate, such as any of the "substrates" described above, and a cured coating layer over at least a portion of the substrate. The cured coating layer can be formed from any of the curable coating compositions described above.

The invention will be further described by reference to the following examples. Unless otherwise indicated, all parts are by weight.

EXAMPLES

Example A below describes preparation of the polyether carbamate additive of the invention. Examples B through F describe the preparation of polymers used in the preparation of the tints and base coats. Examples 1 through 8 describe white base coat formulations. Example 1 is a comparative example. Examples 9 through 11 describe black base coat formulations. Example 9 is a comparative example. Examples 12 through 16 describe silver base coat formulations. Example 12 is a comparative example. Examples 13 and 14 describe silver base coats with addition of the polyether carbamate of Example A. Examples 15 and 16 are comparative examples, which are the same as Examples 13 and 14 except for the replacement of the polyether carbamate of Example A with a competitive urethane diol additive.

Example A

Preparation of the Polyether Carbamate Additive

A hydroxy functional polyether carbamate was prepared from the following ingredients:

| Ingredients | Amount (grams) | Equivalents |
| --- | --- | --- |
| JEFFAMINE D 400[1] | 2000 | 10 |
| Ethylenecarbonate | 968 | 11 |

[1]Polypropyleneoxide amine from Huntsman Corporation, Texas.

PROCEDURE: Both the ingredients were added to the reaction vessel and heated to 130° C. The reaction mixture was held at this temperature till greater than 90% of the amine was reacted as measured by potentiometric titration of the mixture, in which the mixture was solubilized in acetic acid and titrated with 0.1 N (normal) perchloric acid in glacial acetic acid. The product was slightly yellowish, had a theoretical % weight solids of 100%, and weight averaged molecular weight of 800 as measured by gel permeation chromatography using polystyrene as internal standard.

Example B

Preparation of Acrylic Latex used in Basecoats of Examples 1-16

Preparation of Isostearic acid polyester. A polyester was prepared in a four-neck round bottom flask equipped with a thermometer, mechanical stirrer, condenser, dry nitrogen sparge, and a heating mantle. The following ingredients were used:

| Component | Amount (grams) |
|---|---|
| Isostearic acid | 1103.0 |
| Pentaerythritol | 800.0 |
| Crotonic acid | 470.0 |
| Phthalic anhydride | 688.0 |
| Dibutyltin oxide | 6.1 |
| Triphenyl phosphite | 6.1 |
| Butyl acrylate | 1170.0 |
| NAUGARD® BHT[1] | 4.0 |

[1]Butylated hydroxytoluene antioxidant available from Merisol Antioxidants, L.L.C.

The first six ingredients were stirred in the flask at a temperature of 210° C. until 245 ml of distillate was collected and the acid value dropped to 4.6. The material was cooled to 77° C. and the last two ingredients were stirred in. The final product was a viscous yellow liquid with a hydroxyl value of 54.0, a Gardner-Holdt viscosity of Z+, a weight average molecular weight of 45,600, and a non-volatile content of 70.2%.

Preparation of Latex: A pre-emulsion was prepared by stirring together the following ingredients:

| Component | Amount (grams) |
|---|---|
| Isostearic acid polyester described above | 286.0 |
| butyl acrylate | 664.0 |
| Ethylene glycol dimethacrylate | 30.0 |
| acrylic acid | 20.0 |
| Dodecylbenzenesulfonic acid (70% in isopropanol) | 46.4 |
| Dimethylethanolamine | 14.3 |
| Water | 1000.0 |

The pre-emulsion was passed once through a Microfluidizer®.RTM. M110T at 8000 psi and transferred to a four-neck round bottom flask equipped with an overhead stirrer, condenser, thermometer, and a nitrogen atmosphere. One hundred fifty grams (150.0 g) of water used to rinse the Microfluidizer.RTM. was added to the flask. The polymerization was initiated by adding 3.0 g of isoascorbic acid and 0.02 g of ferrous ammonium sulfate dissolved in 120.0 g water followed by a ten minute addition of 5.0 g of 70% t-butyl hydroperoxide dissolved in 115.0 g of water. The temperature of the reaction increased from 23° C. to 80° C. The temperature was reduced to <30° C. and 1.0 g of isoascorbic acid dissolved in 8.0 g water was added. Ten minutes later 17 g of 33.3% aqueous dimethylethanolamine was added followed by 2.0 g of PROXEL GXL (Biocide available from ICI Americas, Inc.) in 8.0 g of water.

The final pH of the latex was 6.1, the nonvolatile content was 42.4%, the particle size was 105 nm, and the Brookfield viscosity was 14 cps (spindle #1, 50 rpm).

Example C

Preparation of Acrylic Grind Vehicle used in Examples G, H, and 12-16

The acrylic grind vehicle was prepared from the following ingredients:

| | Ingredients | Weight in grams |
|---|---|---|
| Feed A: | butyl ether of diethylene glycol | 200.0 |
| | Water | 32.0 |
| Feed B: | Styrene | 255.0 |
| | butyl acrylate | 297.5 |
| | butyl methacrylate | 153.0 |
| | hydroxyethyl methacrylate | 72.3 |
| | acrylic acid | 72.3 |
| Feed C: | tertiary butyl peracetate | 14.5 |
| | butyl ether of diethylene glycol | 140.0 |
| Feed D: | 50% aqueous dimethylethanol amine | 59.0 |
| Feed E: | Water | 1971.0 |

A suitable reactor was charged with feed A and heated to reflux. Feeds B and C were then added simultaneously over 3 hours, followed by a one hour hold. The reaction product was then cooled below 100° C. and feed D was added. Finally, Feed E, preheated to 70° C., was added slowly. The final product had solid content of about 25%.

Example D

Preparation of Acid Functional Polyester used in Examples 12-16

A polyacid half-ester of 1-(3-hydroxy-2,2-dimethylpropyl)-3-hydroxy-2,2-dimethylpropionate (ESTER DIOL 204) and methylhexahydrophthalic anhydride was prepared from the following mixture of ingredients:

| Component | Parts by Weight (in grams) |
|---|---|
| ESTER DIOL 204[1] | 2550.0 |
| Methylhexahydrophthalic anhydride | 4116.0 |
| Methyl isobutyl ketone | 1466.5 |
| Ethanol | 666.6 |

[1]Available from Union Carbide.

The ESTER DIOL 204 and 1466.5 grams of the methyl isobutyl ketone were charged to a reaction vessel and heated under a nitrogen atmosphere to 115° C. The methylhexahydrophthalic anhydride was added over a 90-minute period. The reaction mixture was then held at 115° C. for four hours. The reaction mixture was then cooled to 100° C. followed by the addition of ethanol (to react with residual anhydride) and heating the reaction mixture to reflux and holding for two hours. The reaction mixture was stripped under vacuum to a pot temperature of 125° C. The reaction mixture was then adjusted to 80 percent solids with methyl isobutyl ketone.

Example E

Preparation of Polyester Polymer used in Examples 9 through 11

| Component | Parts by Weight (in grams) |
|---|---|
| 1,4-Cyclohexane Dicarboxylic Acid | 344.0 |
| Isostearic Acid | 568.0 |
| Trimethylol propane | 540.0 |
| Triphenyl phosphite | 3.60 |
| Dibutyltin Oxide | 2.60 |

The above components were charged into a three-liter, four-necked round bottom flask equipped with a motor driven stainless steel paddle agitator, a thermocouple to record batch temperature, a Dean-Stark water trap connected with a condenser to collect distillate evolved, and a nitrogen sparge tube.

The synthesis was performed using azeotropic conditions with xylene (3% on solids). Heat was applied to a Glas-Col heating mantle and the temperature was gradually increased to about 220° C. and held until an acid value of less than four was obtained.

Example F

Preparation of Acrylic Grind Vehicle used in Example G

A polyurethane acrylate was prepared from the following ingredients:

| Materials | Amount (grams) |
|---|---|
| Polyester polyol[1] | 934.0 |
| hydroxyethyl acrylate (HEA) | 108.0 |
| dibutyltin dilaurate | 1.2 |
| IONOL | 1.2 |
| Hexamethylenediisocyanate (HDI) | 157.2 |
| butyl acrylate (BA) | 262.2 |

[1]Polyester polyol having a hydroxyl value of 120 prepared from trimethylolpropane (15.2 weight %), neopentyl glycol (35.3 weight %), and adipic acid (49.5 weight %).

The first four ingredients were stirred in a flask as the HDI was added over a one hour period at a temperature of 70°-80° C. 39 g of the butyl acrylate was used to rinse the addition funnel containing the HDI and the temperature of the mixture was then held at 70° C. for an additional 2 hours as all the isocyanate reacted. The remainder of the butyl acrylate was added to produce an 80% solution with a Gardner-Holdt viscosity of X.

A pre-emulsion was made by stirring together the following:

| Material | Amount (grams) |
|---|---|
| Polyurethane acrylate described above | 1003.8 |
| butyl acrylate | 98.8 |
| Methyl methacrylate | 147.0 |
| Acrylic acid | 20.6 |
| Dimethylethanolammonium dodecylbenzene sulfonate, 50% in water (DDBSA/DMEA) | 13.52 |
| Alipal Co 436[1], | 46.16 |
| AEROSOL OT-75[2] | 17.92 |
| Water | 1246.0 |

[1]Anionic surfactant, available from Rhodia Chemicals.
[2]Sodium dioctylsulfosuccinate commercially available from Cytec Industries, Inc.

The pre-emulsion was passed once through a M110 Microfluidizer.RTM. emulsifier at 7000 is to produce a microdispersion. The microdispersion was stirred at 22° C. under nitrogen in a round bottom flask and the following solutions were added.

| Material | Amount (grams) |
|---|---|
| deionized water | 429.9 |
| isoascorbic acid | 2.0 |
| 1% aqueous ferrous ammonium sulfate | 2.86 |
| 30% aqueous hydogen peroxide | 2.94 |
| dimethylethanol amine | 21.5 |

The temperature rose spontaneously to 56° C. within 15 minutes. The final product had the following characteristics: total solids was 42%; pH was 8.3; Brookfield viscosity (50 rpm, spindle #1) was 14 centistokes per second; and average particles size was 201 nm.

Example G

Preparation of White Tint used in Examples 1 through 8

The following were added to a vessel in order.

| Component | Amount (parts by weight) |
|---|---|
| Deionized Water | 125.933 |
| Add under agitation | |
| Acrylic Grind Vehicle of Example C | 235.476 |
| Acrylic Grind Vehicle of Example F | 145.753 |
| DOWANOL PM[1] | 10.603 |
| ARCOL PPG-425[2] | 20.506 |
| DOWANOL PNB[3] | 30.724 |
| DOWANOL DPM[4] | 33.024 |
| Shell Odorless Mineral Spirits[5] | 25.347 |
| Dimethyl ethanolamine 50% in water | 11.509 |
| Mix 5 minutes at low rpm then add | |
| R-900-39 E.D. TiO$_2$ | 1109.754 |

[1]Propylene glycol monomethyl ether available from Dow Chemical Company.
[2]Polypropylene glycol available from Dow Chemical Company.
[3]Propylene glycol n-butyl ether available from Dow Chemical Company.
[4]Dipropylene glycol monomethyl ether available from Dow Chemical Company.
[5]Available from Shell Oil and Chemical Company.

The mixture was mixed by cowles blade for 60 minutes at high speed. Then the following ingredients were added under agitation:

| Component | Amount (parts by weight) |
|---|---|
| Deionized Water | 52.997 |
| DOWANOL PM | 20.194 |
| ARCOL PPG-425 | 20.194 |
| Dimethyl ethanolamine 50% in water | 11.509 |

Example H

Preparation of Black Tint used in Examples 9 through 11

The following components were premixed under agitation for five minutes:

| Component | Amount (parts by weight) |
| --- | --- |
| DOWANOL PM | 52.885 |
| DOWANOL PNP[1] | 52.885 |
| Deionized Water | 97.886 |
| Acrylic Grind Vehicle of Example C. | 587.250 |
| 50% Dimethyl ethanolamine solution in water | 11.509 |

[1]Propylene glycol n-propyl ether available from Dow Chemical Company.

54.173 parts by weight of Monarch 1300 Black Pigment (available from Cabot Specialty Chemicals) was then added over a period of no more than 15 minutes and predispersed with a cowles blade. The predispersion was milled for 11 hours with 1.6 mm steel media at 80 gallons per hour in a dual chamber Premier mill. In the dual chamber Premier mill configuration, the material is recirculated through two Premier mill chambers which are connected in series.

The pH was adjusted after the first pass to 7.85 to 8.20 with a 50% solution of dimethyl ethanolamine in water.

Comparative Example 1

Preparation of White Aqueous Basecoat

| Component | Parts by Weight (grams) |
| --- | --- |
| AQUEOUS PORTION | |
| Deionized Water | 35.0 |
| Shell Odorless Mineral Spirits[1] | 15.0 |
| Acrylic Latex of Example B | 158.0 |
| White Tint of Example G | 225.0 |
| ORGANIC PORTION | |
| DOWANOL PNB | 37.0 |
| CYMEL 303LF[2] | 37.0 |
| Propylene Glycol | 13.0 |

[1]Available from Shell Oil and Chemical Company.
[2]Melamine crosslinker available from Cytec Industries, Inc.

The aqueous portion of the white basecoat was assembled by adding each component under agitation in the order shown and mixing the mixture for 10 minutes. In a separate vessel, the three components of the organic portion were combined and mixed until uniform. The organic portion was added to the aqueous portion slowly under agitation. The mixture of the aqueous and organic portions was agitated for 20 minutes.

The pH was adjusted to 8.5 to 8.7 with a 50% solution of dimethylethanol amine and deionized water. The paint was allowed to equilibrate for 24 hours and, if necessary, a final pH adjustment was made as described above. The paint was reduced with deionized water to a viscosity of 28 to 30 seconds using a #4 Ford Cup accordance with ASTM D 1200-99 before spraying.

Example 2

Addition of 2% on Resin Solids of the Additive of Example A to the White Aqueous Basecoat of Comparative Example 1

To 1021 parts by weight of the white aqueous basecoat of Comparative Example 1, before letdown to spray viscosity, was added 5 parts by weight of the polyether carbamate additive of Example A. The additive of Example A was added under agitation and agitation was continued until the mixture was uniform. The resulting white aqueous basecoat contained 2% of the resin solids of Example A based on the weight of the resin solids of the mixture of Example A and Comparative Example 1.

Example 3

Addition of 5% on Resin Solids of the Additive of Example A to the White Aqueous Basecoat of Comparative Example 1

To 1004 parts by weight of the white aqueous basecoat of Comparative Example 1, before letdown to spray viscosity, was added 12 parts by weight of the polyether carbamate additive of Example A. The additive of Example A was added under agitation and agitation was continued until the mixture was uniform. The resulting white aqueous basecoat contained 5% of the resin solids of Example A based on the weight of the resin solids of the mixture of Example A and Comparative Example 1.

Example 4

Addition of 10% on Resin Solids of the Additive of Example A to the White Aqueous Basecoat of Comparative Example 1

To 520 parts by weight of the white aqueous basecoat of Comparative Example 1, before letdown to spray viscosity, was added 12.5 parts by weight of the polyether carbamate additive of Example A. The additive of Example A was added under agitation and agitation was continued until the mixture was uniform. The resulting white aqueous basecoat contained 10% of the resin solids of Example A based on the weight of the resin solids of the mixture of Example A and Comparative Example 1.

Example 5

Addition of 15% on Resin Solids of the Additive of Example A to the White Aqueous Basecoat of Comparative Example 1

To 944 parts by weight of the white aqueous basecoat of Comparative Example 1, before letdown to spray viscosity, was added 37 parts by weight of the polyether carbamate additive of Example A. The additive of Example A was added under agitation and agitation was continued until the mixture was uniform. The resulting white aqueous basecoat contained 15% of the resin solids of Example A based on the weight of the resin solids of the mixture of Example A and Comparative Example 1.

Example 6

Addition of 20% on Resin Solids of the Additive of Example A to the White Aqueous Basecoat of Comparative Example 1

To 496 parts by weight of the white aqueous basecoat of Comparative Example 1, before letdown to spray viscosity, was added 25 parts by weight of the polyether carbamate additive of Example A. The additive of Example A was added under agitation and agitation was continued until the mixture was uniform. The resulting white aqueous basecoat contained 20% of the resin solids of Example A based on the weight of the resin solids of the mixture of Example A and Comparative Example 1.

Example 7

Addition of 30% on Resin Solids of the Additive of Example A to the White Aqueous Basecoat of Comparative Example 1

To 857 parts by weight of the white aqueous basecoat of Comparative Example 1, before letdown to spray viscosity, was added 74 parts by weight of the polyether carbamate additive of Example A. The additive of Example A was added under agitation and agitation was continued until the mixture was uniform. The resulting white aqueous basecoat contained 30% of the resin solids of Example A based on the weight of the resin solids of the mixture of Example A and Comparative Example 1.

Example 8

Addition of 54% on Resin Solids of the Additive of Example A to the White Aqueous Basecoat of Comparative Example 1

To 721 parts by weight of the white aqueous basecoat of Comparative Example 1, before letdown to spray viscosity, was added 131 parts by weight of the polyether carbamate additive of Example A. The additive of Example A was added under agitation and agitation was continued until the mixture was uniform. The resulting white aqueous basecoat contained 54% of the resin solids of Example A based on the weight of the resin solids of the mixture of Example A and Comparative Example 1.

Comparative Example 9

Preparation of Black Aqueous Basecoat

| COMPONENT | Parts by Weight (in grams) |
|---|---|
| AQUEOUS PORTION | |
| Shell Odorless Mineral Spirits[1] | 13.5 |
| Acrylic Latex of Example B | 132.0 |
| Deionized Water | 88.5 |
| Urethane Resin[2] | 13.0 |
| Black Tint of Example H | 57.0 |
| 50% Dimethylethanolamine in Water | 1.0 |
| ORGANIC PORTION | |
| N-butoxypropanol | 40.0 |
| N-methyl-2-pyrrolidone | 6.0 |
| CYMEL 327 | 42.0 |
| TINUVIN 1130[3] | 3.4 |
| Polyester Resin of Example E | 6.3 |
| Phosphatized Epoxy Resin[4] | 1.0 |

[1]Available from Shell Oil and Chemical Company.
[2]Daotan VTW6462/36WA available from Solutia, Inc.
[3]Available from Ciba Specialty Chemicals, Inc.
[4]Phosphatized epoxy prepared from EPON 828 (a polyglycidyl ether of Bisphenol A, available from Shell Oil and Chemical Co.); reacted with phosphoric acid at a weight ratio of 83:17.

The aqueous portion of the black basecoat was assembled from the components listed above. Each component was added under agitation and the mixture was mixed for 10 minutes. In a separate vessel, the components of the organic portion listed above were combined in the order shown and agitated until well dispersed. The Organic Portion was then were added to the Aqueous Portion by slow addition under agitation. The mixture of the Aqueous Portion and the Organic Portion was agitated for 20 minutes. The pH was adjusted to 8.5 to 8.7 with a 50% solution of dimethylethanol amine and deionized water. The paint was allowed to equilibrate for 24 hours and, if necessary, a final pH adjustment was made as described above. The paint was reduced with deionized water to a viscosity of 28 to 30 seconds using a #4 Ford Cup in accordance with ASTM D 1200-99 before spraying.

Example 10

Addition of 10% on Resin Solids of the Additive of Example A to the Black Aqueous Basecoat of Comparative Example 9

To 380 parts by weight of the black aqueous basecoat of Comparative Example 9, before letdown to spray viscosity, was added 12 parts by weight of the polyether carbamate additive of Example A. The additive of Example A was added under agitation and agitation was continued until the mixture was uniform. The resulting black aqueous basecoat contained 10% of the resin solids of Example A based on the weight of the resin solids of the mixture of Example A and Comparative Example 9.

Example 11

Addition of 20% on Resin Solids of the Additive of Example A to the Black Aqueous Basecoat of Comparative Example 9

To 356 parts by weight of the black aqueous basecoat of Comparative Example 9, before letdown to spray viscosity, was added 24 parts by weight of the polyether carbamate additive of Example A. The additive of Example A was added under agitation and agitation was continued until the mixture was uniform. The resulting black aqueous basecoat contained 20% of the resin solids of Example A based on the weight of the resin solids of the mixture of Example A and Comparative Example 9.

Comparative Basecoat Examples in Silver Color

Comparative Example 12

Preparation of Silver Basecoat with No Polyether Carbamate Additive

| Component | Parts by Weight (in grams) |
|---|---|
| Aqueous Portion | |
| Shell Odorless Mineral Spirits[1] | 6.0 |
| Acrylic Latex of Example B | 140.0 |
| Deionized water | 50.0 |
| Acrylic Grind Vehicle of Example C | 23.1 |
| 50% solution of Dimethylethanol amine in Water | 2.2 |
| Organic Portion | |
| N-Butoxypropanol | 45.04 |
| CYMEL 303LF | 25.00 |
| CYMEL 385[2] | 6.25 |

| Component | Parts by Weight (in grams) |
|---|---|
| TINUVIN 1130 | 1.40 |
| AQUA PASTE 3620-D23[3] | 23.50 |
| AQUA PASTE 3700-A23[4] | 6.50 |
| Phosphatized Epoxy[5] | 0.39 |
| Thickener Portion | |
| Deionized water | 10.0 |
| 50% solution of Dimethylethanol amine in Water | 2.5 |
| Acid Functional Polyester of Example D | 5.0 |

[1]Available from Shell Oil and Chemical Company.
[2]Melamine crosslinker available from Cytec Industries, Inc.
[3]Available from Silberline Mfg.
[4]Available from Silberline Mfg.
[5]Phosphatized epoxy prepared from EPON 828 (a polyglycidyl ether of Bisphenol A, available from Shell Oil and Chemical Co.); reacted with phosphoric acid at a weight ratio of 83:17.

The aqueous portion of the silver basecoat was assembled from the components listed above. Each component was added under agitation in the order shown and the mixture was mixed for 10 minutes.

In a separate vessel the first four components of the organic portion listed above were combined and then agitated until well dispersed. The next two materials were then added under agitation and mixed for 20 minutes or until well dispersed. The last material was added under agitation until dispersed. The organic portion was added slowly to the aqueous portion and agitated for 20 minutes. The pH was adjusted to 8.5-8.7 with a 50% solution of dimethylethanol amine and deionized water.

In a separate container, the thickener portion of the basecoat was prepared by combining the three materials listed above under agitation and mixing for 20 minutes.

The thickener portion was then added and again the pH was adjusted to 8.5-8.7. The paint was allowed to equilibrate for 24 hours before the final pH adjustment was made. The paint was then reduced with deionized water before spraying to a viscosity of 25-27 seconds using a 4 Ford Cup accordance with ASTM D 1200-99.

Example 13

Preparation of Silver Basecoat with 7% on Resin Solids of the Polvether Carbamate Additive of Example A

| Component | Parts by Weight (in grams) |
|---|---|
| Aqueous Portion | |
| Shell Odorless Mineral Spirits[1] | 6.00 |
| Acrylic Latex of Example B | 123.13 |
| Deionized water | 50.00 |
| Acrylic Grind Vehicle of Example C | 23.10 |
| 50% solution of Dimethylethanol amine in Water | 2.20 |
| Organic Portion | |
| N-Butoxypropanol | 45.04 |
| CYMEL 303LF | 25.00 |
| CYMEL 385 | 6.25 |
| TINUVIN 1130 | 1.40 |
| AQUA PASTE 3620-D23 | 23.50 |
| AQUA PASTE 3700-A23 | 6.50 |
| Phosphatized Epoxy[2] | 0.39 |
| Thickener Portion | |
| Deionized water | 10.00 |
| 50% solution of Dimethylethanol amine in Water | 2.50 |
| Acid Functional Polyester of Example D | 5.00 |
| Polyoxyalkylene Carbamate Addition | |
| Additive of Example A | 7.00 |

[1]Available from Shell Oil and Chemical Company.
[2]Phosphatized epoxy prepared from EPON 828 (a polyglycidyl ether of Bisphenol A, available from Shell Oil and Chemical Co.); reacted with phosphoric acid at a weight ratio of 83:17.

An addition of 7% based on total resin solids of the additive of Example A was made to the silver basecoat by reducing the Acrylic Latex of Example B by 7% on resin solids. The additive of Example A was post-added to the coating as described below.

The aqueous portion of a silver basecoat was assembled from the components listed above. Each component was added under agitation in the order shown and the mixture was mixed for 10 minutes.

In a separate vessel the first four components of the organic portion listed above were combined and then agitated until well dispersed. The next two materials were then added under agitation and mixed until well dispersed. The last material was added under agitation until dispersed.

In a separate container, the thickener portion of the basecoat was prepared by combining under agitation the three materials listed above and mixing for 20 minutes.

The organic portion was added slowly to the aqueous portion and agitated for 20 minutes. The pH was adjusted to 8.5-8.7 with a 50% solution of dimethylethanol amine and deionized water. The thickener portion was then added and again the pH was adjusted to 8.5-8.7.

The additive of Example A was added before the reduction of the basecoat to spray viscosity.

The paint was allowed to equilibrate for 24 hours before the final pH adjustment was made. The paint was then reduced with deionized water before spraying to a viscosity of 25-27 seconds using a 4 Ford Cup accordance with ASTM D 1200-99.

Example 14

Preparation of Silver Basecoat with 15% on Resin Solids of the Polvether Carbamate Additive of Example A

| Component | Parts by Weight (in grams) |
|---|---|
| Aqueous Portion | |
| Shell Odorless Mineral Spirits[1] | 6.00 |
| Acrylic Latex of Example B | 103.85 |
| Deionized water | 50.00 |
| Acrylic Grind Vehicle of Example C | 23.10 |
| 50% solution of Dimethylethanol amine in Water | 2.20 |
| Organic Portion | |
| N-Butoxypropanol | 45.04 |
| CYMEL 303LF | 25.00 |
| CYMEL 385 | 6.25 |
| TINUVIN 1130 | 1.40 |

-continued

| Component | Parts by Weight (in grams) |
|---|---|
| AQUA PASTE 3620-D23 | 23.50 |
| AQUA PASTE 3700-A23 | 6.50 |
| Phosphatized Epoxy[2] | 0.39 |
| Thickener Portion | |
| Deionized water | 10.00 |
| 50% solution of Dimethylethanol amine in Water | 2.50 |
| Acid Functional Polyester of Example D | 5.0 |
| Polyoxyalkylene Carbamate Addition | |
| Additive of Example A | 15.0 |

[1]Available from Shell Oil and Chemical Company.
[2]Phosphatized epoxy prepared from EPON 828 (a polyglycidyl ether of Bisphenol A, available from Shell Oil and Chemical Co.); reacted with phosphoric acid at a weight ratio of 83:17.

An addition of 15% based on total resin solids of the additive of Example A was made to the silver basecoat by reducing the Acrylic Latex of Example B by 15% on resin solids. The additive of Example A was post-added to the coating as described below.

The aqueous portion of a silver basecoat was assembled from the components listed above. Each component was added under agitation in the order shown and the mixture was mixed for 10 minutes.

In a separate vessel the first four components of the organic portion listed above were combined and then agitated until well dispersed. The next two materials were then added under agitation and mixed until well dispersed. The last material was added under agitation until dispersed.

In a separate container, the thickener portion of the basecoat was prepared by combining under agitation the three materials listed above and mixing for 20 minutes.

The organic portion was added slowly to the aqueous portion and agitated for 20 minutes. The pH was adjusted to 8.5-8.7 with a 50% solution of dimethylethanol amine and deionized water. The thickener portion was then added and again the pH was adjusted to 8.5-8.7.

The additive of Example A was added before the reduction of the basecoat to spray viscosity.

The paint was allowed to equilibrate for 24 hours before the final pH adjustment was made. The paint was then reduced with deionized water before spraying to a viscosity of 25-27 seconds using a 4 Ford Cup accordance with ASTM D 1200-99.

Comparative Example 15

Preparation of Silver Basecoat with 7% on Resin Solids of Competitive Additive

| Component | Parts by Weight (in grams) |
|---|---|
| Aqueous Portion | |
| Shell Odorless Mineral Spirits[1] | 6.00 |
| Acrylic Latex of Example B | 123.13 |
| Deionized water | 50.00 |
| Acrylic Grind Vehicle of Example C | 23.10 |
| 50% solution of Dimethylethanol amine in Water | 2.20 |
| Organic Portion | |
| N-Butoxypropanol | 45.04 |
| CYMEL 303LF | 25.00 |
| CYMEL 385 | 6.25 |
| TINUVIN 1130 | 1.40 |
| AQUA PASTE 3620-D23 | 23.50 |
| AQUA PASTE 3700-A23 | 6.50 |
| Phosphatized Epoxy[2] | 0.39 |
| Thickener Portion | |
| Deionized water | 10.00 |
| 50% solution of Dimethylethanol amine in Water | 2.50 |
| Acid Functional Polyester of Example D | 5.00 |
| Competitive Additive Addition | |
| K-FLEX XM4306[3] | 7.0 |

[1]Available from Shell Oil and Chemical Company.
[2]Phosphatized epoxy prepared from EPON 828 (a polyglycidyl ether of Bisphenol A, available from Shell Oil and Chemical Co.); reacted with phosphoric acid at a weight ratio of 83:17.
[3]Available from King Industries An addition of 7% based on total resin solids of the additive of Example A was made to the silver basecoat by reducing the Acrylic Latex of Example B by 7% on resin solids. The additive of Example A was post-added to the coating as described below.

The aqueous portion of a silver basecoat was assembled from the components listed above. Each component was added under agitation in the order shown and the mixture was mixed for 10 minutes.

In a separate vessel the first four components of the organic portion listed above were combined and then agitated until well dispersed. The next two materials were then added under agitation and mixed until well dispersed. The last material was added under agitation until dispersed.

In a separate container, the thickener portion of the basecoat was prepared by combining under agitation the three materials listed above and mixing for 20 minutes.

The organic portion was added slowly to the aqueous portion and agitated for 20 minutes. The pH was adjusted to 8.5-8.7 with a 50% solution of dimethylethanol amine and deionized water. The thickener portion was then added and again the pH was adjusted to 8.5-8.7.

The additive of Example A was added before the reduction of the basecoat to spray viscosity.

The paint was allowed to equilibrate for 24 hours before the final pH adjustment was made. The paint was then reduced with deionized water before spraying to a viscosity of 25-27 seconds using a 4 Ford Cup accordance with ASTM D 1200-99.

Comparative Example 16

Preparation of Silver Basecoat with 15% on Resin Solids of Competitive Additive

| Component | Parts by Weight (in grams) |
|---|---|
| Aqueous Portion | |
| Shell Odorless Mineral Spirits[1] | 6.00 |
| Acrylic Latex of Example B | 103.85 |
| Deionized water | 50.00 |
| Acrylic Grind Vehicle of Example C | 23.10 |
| 50% solution of Dimethylethanol amine in Water | 2.20 |

-continued

| Component | Parts by Weight (in grams) |
|---|---|
| Organic Portion | |
| N-Butoxypropanol | 45.04 |
| CYMEL 303LF | 25.00 |
| CYMEL 385 | 6.25 |
| TINUVIN 1130 | 1.40 |
| AQUA PASTE 3620-D23 | 23.50 |
| AQUA PASTE 3700-A23 | 6.50 |
| Phosphatized Epoxy[2] | 0.39 |
| Thickener Portion | |
| Deionized water | 10.00 |
| 50% solution of Dimethylethanol amine in Water | 2.50 |
| Acid Functional Polyester of Example D | 5.0 |
| Competitive Additive Addition | |
| K-FLEX XM4306 | 15.0 |

[1]Available from Shell Oil and Chemical Company.
[2]Phosphatized epoxy prepared from EPON 828 (a polyglycidyl ether of Bisphenol A, available from Shell Oil and Chemical Co.); reacted with phosphoric acid at a weight ratio of 83:17.

An addition of 15% based on total resin solids of the additive of Example A was made to the silver basecoat by reducing the Acrylic Latex of Example B by 15% on resin solids. The additive of Example A was post-added to the coating as described below.

The aqueous portion of a silver basecoat was assembled from the components listed above. Each component was added under agitation in the order shown and the mixture was mixed for 10 minutes.

In a separate vessel the first four components of the organic portion listed above were combined and then agitated until well dispersed. The next two materials were then added under agitation and mixed until well dispersed. The last material was added under agitation until dispersed.

In a separate container, the thickener portion of the basecoat was prepared by combining under agitation the three materials listed above and mixing for 20 minutes.

The organic portion was added slowly to the aqueous portion and agitated for 20 minutes. The pH was adjusted to 8.5-8.7 with a 50% solution of dimethylethanol amine and deionized water. The thickener portion was then added and again the pH was adjusted to 8.5-8.7.

The additive K-FLEX XM4306 was added before the reduction of the basecoat to spray viscosity.

The paint was allowed to equilibrate for 24 hours before the final pH adjustment was made. The paint was then reduced with deionized water before spraying to a viscosity of 25-27 seconds using a 4 Ford Cup accordance with ASTM D 1200-99.

Preparation of Test Panels Coated with Basecoats of Examples 1 to 16

The basecoats were applied on unpolished B952 P60 pretreated cold rolled steel panels (available from ACT Laboratories, Inc.) which had been electrocoated with ED5000 electrodeposition primer (available from PPG Industries, Inc.) and then coated in one coat with 1177224ER (a primer-surfacer available from PPG Industries, Inc.) using the Sames 402 gun mounted on the Kohne machine. The resulting basecoat had a dry film build of 0.5-0.7 mils. The basecoats were given a five minute ambient flash and then prebaked under the following various conditions:

The white and black basecoats of Examples 1 to 11 were baked 10 minutes at 250° F. in order to simulate an overbake condition on a commercial paint line.

The silver basecoats of Examples 12 to 16 each were baked under the following conditions:

1. 10 minutes at 250° F. (121° C.) prebake; and
2. 30 minutes at 250° F. (121° C.) followed by application of repair base coat, and subsequent curing for 5 minute at 200° F. (93° C.) prebake.

A two component clearcoat, TKU-1050AR (available from PPG Industries, Inc.) was applied to the basecoated panels prepared as described above. The clearcoat was applied in a two-coat application using the same parameters as was the basecoat. The coated panels were given a ten minute ambient flash period before baking at 30 minutes at 250° F. (121° C.). The clearcoat film build was 1.8-2.0 mils.

Testing of the White and Black Basecoats
(Examples 1 to 11)

Adhesion was tested 24 hours after clearcoating using a razor knife to cut a 6×6 two-millimeter grid through the total paint coating and then taping with black TESA tape. The adhesion was rated using ASTM D 3359-97 which assigns a whole number percentage from 100 (no adhesion loss) to 0 (total adhesion loss). In this case an acceptable adhesion rating was a value ranging from 80-100. For the 10 minutes at 250° F. (121 ° C.) prebake scenario, the adhesion loss was between clearcoat and basecoat.

TABLE 1

Basecoat-Clearcoat Intercoat Adhesion Tests

| Basecoat | Basecoat Color | % (on resin solids) polyether carbamate of Example A | % Clearcoat Adhesion after 24 hours[1] |
|---|---|---|---|
| Comparative Example 1 | White | 0 | 53 |
| Example 4 | White | 10 | 100 |
| Example 6 | White | 20 | 85 |
| Comparative Example 9 | Black | 0 | 0 |
| Example 10 | Black | 10 | 82 |
| Example 11 | Black | 20 | 98 |

Table 1 shows the results of the adhesion testing of the white and black basecoats with varying levels of the polyether carbamate additive of Example A.

Comparative Example 1, which contains no polyether carbamate additive, does not exhibit acceptable clearcoat to basecoat adhesion when the basecoat undergoes an extended dehydration (10 minutes at 250° F. (121° C.) prebake). The addition of the polyether carbamate additive of Example A at the 10% and 20% level improves the adhesion to an acceptable level.

Comparative Example 9, which contains no polyether carbamate additive, had very poor clearcoat to basecoat adhesion, the addition of the polyether carbamate of the present invention greatly improved the adhesion at 10% level, at 20% level it improved even further.

TABLE 2

White Aqueous Basecoat Viscosity Stability

| Basecoat | % (on resin solids) polyether carbamate of Example A | Viscosity Change (seconds) |
| --- | --- | --- |
| Comparative Example 1 | 0 | 27 |
| Example 2 | 2 | 18 |
| Example 3 | 5 | 16 |
| Example 5 | 15 | 6 |
| Example 7 | 30 | 6 |
| Example 8 | 54 | −4 |

The data presented in Table 2 shows the effect of increasing levels of the polyether carbamate of Example A on the viscosity stability of the white basecoat of Example 1. The #4 Ford viscosity of the basecoat compositions was measured in accordance with ASTM D1200-99 after which they were placed in a 140° F. (60° C.) hotroom for a period of 16 hours. The basecoats were allowed to cool and #4 Ford viscosity was remeasured. At the 15% of additive level of polyether carbamate, the viscosity increased only 6 seconds, where the viscosity of the comparative composition, with no polyether carbamate additive, increased 27 seconds. For the purposes of this evaluation, a viscosity increase of greater than 15 seconds was considered to be unacceptable.

Comparative Testing of the Additive of Example A with a Commercial Urethane Diol in the Silver Basecoat The adhesion properties of the silver basecoats (Examples 12 through 16) was tested at 1 hour and again at 24 hours after clearcoating. The adhesion test used a razor knife to cut a 6×6 two-millimeter grid through the total paint coating and then taped with black TESA tape. The adhesion was rated using ASTM D 3359-97, which assigns a whole number from 5 (no adhesion loss) to 0 (total adhesion loss). In this case an acceptable adhesion rating was a 5 or a 4. For the 10 minutes at 250° F. prebake scenario the adhesion loss was between clearcoat and basecoat. For the 30 minutes at 250° F. (121° C.)/5 minutes at 250° F. (121° C.) prebake the adhesion loss was between the basecoat layers.

Panels were placed into a 100% relative humidity/100° F. (38° C.) environment for 240 hours, and tested within 15 minutes of removal for adhesion using the X-scribe method and cellophane tape, according to ASTM D 3359-97. A delamination of less than 2 mm from the scribe line passed the test, and a delamination of greater than 2 mm was considered to be a failure.

TABLE 3

Comparative Testing of the Additive of Example A and K-FLEX XM4306 in Silver Basecoat

| Base Coat Example | Additive | Bake Condition A[1] | | Bake Condition B[2] | | GM AUTO SPEC[3] Appearance | Humidity X-scribe adhesion |
| --- | --- | --- | --- | --- | --- | --- | --- |
| | | Crosshatch Adhesion 1 hr after clearcoat | Crosshatch Adhesion 24 hours after clearcoat | Crosshatch Adhesion 1 hr after clearcoat | Crosshatch Adhesion 24 hours after clearcoat | | |
| 12* | None | 0 | 0 | 0 | 0 | 65.2 | Pass |
| 13 | 7% rs Additive of Example A | 5 | 5 | 0 | 5 | 70.0 | Pass |
| 14 | 15% rs Additive of Example A | 5 | 5 | 5 | 5 | 63.6 | Pass |
| 15* | 7% rs K-FLEX XM4306 Competitive Additive | 0 | 0 | 0 | 0 | 62.5 | Fail |
| 16* | 15% rs K-FLEX XM4306 Competitive Additive | 5 | 5 | 0 | 5 | 58.7 | Fail |

*Examples 12, 15, and 16 are Comparative Examples
[1]Basecoat baked 10 minutes at 250° F. (121° C.). Then clearcoat applied.
[2]Basecoat baked 30 minutes at 250° F. (121° C.). Then additional coat of basecoat applied and panel baked 5 minutes at 200° F. (93° C.). Then clearcoat applied.
[3]Higher numbers indicate better appearance.

As is shown in Table 3, Comparative Example 12, the silver basecoat with no additive, does not exhibit acceptable crosshatch adhesion under either basecoat bake condition. Addition of 7% on resin solids of the polyether carbamate additive of the present invention, Example A, gives excellent crosshatch adhesion under both bake conditions when tested 24 hours after clearcoat application, and under Bake Condition A when tested both 1 hour and 24 hours after clearcoat application. By contrast, a 7% on resin solids addition of the competitive urethanediol additive, K-FLEX XM4306, fails to show any crosshatch adhesion improvement under either bake condition.

When the additive level of the polyether carbamate additive of the present invention is increased to 15% on resin solids, the crosshatch adhesion is excellent under both basecoat and both clearcoat conditions. At level of the competitive urethanediol additive, however, the basecoat fails crosshatch adhesion under Bake Condition B when tested one hour after clearcoat application.

A further advantage of the polyether carbamate additive of the present invention over the competitive urethanediol additive is that addition of the competitive urethanediol additive negatively impacts humidity resistance of the basecoat. As can be seen in Table 3, addition of the competitive urethanediol additive at either the 7% on resin solids or 15% on resin solids levels causes the basecoat to fail X-scribe adhesion after humidity. By contrast, the polyether carbamate additive of the present invention does not adversely affect the humidity resistance of the basecoat at either the 7% or the 15% on resin solids level.

Also, as can be seen in Table 3 the appearance of the basecoats with the additive of the present invention was better than that of the basecoats with the competitive urethanediol additive.

It will be appreciated by those in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. In a curable coating composition comprising:
   (1) a reactive functional group-containing polymer, and
   (2) a curing agent having functional groups reactive with the functional groups of (1), but when the reactive function groups of (1) comprise epoxy, the curing agent comprises an aminoplast resin, a polyisocyanate, a blocked isocyanate, a polyepoxide, a polyacid, an anhydride, a polyol, or mixtures thereof,
   the improvement comprising the inclusion in the coating composition of (3) at least one reaction product of the following reactants:
      (1) at least one polyoxyalkylene amine selected from the group consisting of polyoxyalkylene monoamine, polyoxyalkylene diamine, polyoxyalkylene triamine,
   wherein the polyoxyalkylene diamine comprises a compound having the following structure (I):

   $$H_2N[R^1—O]_n[R^3—O]_m—R^2—NH_2 \quad (I)$$

where $R^1$, $R^2$, and $R^3$ can be the same or different and each independently represent a $C_2$ to $C_{12}$ alkylene group, and (n+m) represents a value greater than 2, provided that when $R^1$ and $R^3$ are different (n+m) represents a value greater than or equal to 2, and
      (2) at least one cyclic carbonate
   wherein the ratio of equivalents of polyoxyalkylene amine (A) to equivalents of cyclic carbonate (B) ranges from 1:0.5 to 1:1.5.

2. The coating composition of claim 1, wherein the reaction product (3) is present in an amount sufficient to provide viscosity stability of the composition such that the viscosity of the composition increases not more than 50% upon storage for 16 hours at a temperature ranging from 49° C. to 71° C.

3. The coating composition of claim 1, wherein the reaction product (3) is present in an amount sufficient to provide viscosity stability of the composition such that the viscosity of the composition increases not more than 35% upon storage for 16 hours at a temperature ranging from 49° C. to 71° C.

4. The coating composition of claim 1, wherein the reaction product (3) is present in an amount sufficient to provide viscosity stability of the composition such that the viscosity of the composition increases not more than 20% upon storage for 16 hours at a temperature ranging from 49° C. to 71° C.

5. The curable coating composition of claim 1, wherein the ratio of equivalents of polyoxyalkylene amine (A) to equivalents of cyclic carbonate (B) ranges from 1:0.8 to 1:1.1.

6. The curable coating composition of claim 1, wherein the ratio of equivalents of polyoxyalkylene amine (A) to equivalents of cyclic carbonate (B) ranges from 1:0.9 to 1:1.1.

7. The curable coating composition of claim 1, wherein $R^1$, $R^2$, and $R^3$ can be the same or different and each independently represents a moiety selected from ethylene, propylene, and butylene.

8. The curable coating composition of claim 1, wherein $R^1$, $R^2$, and $R^3$ can be the same or different and each independently represents a moiety selected from ethylene and propylene.

9. The curable coating composition of claim 1, wherein the cyclic carbonate comprises a cyclic carbonate selected from the group consisting of ethylene carbonate, propylene carbonate, butylene carbonate, glycerine carbonate, and mixtures thereof.

10. The curable coating composition of claim 1, wherein the cyclic carbonate is selected from at least one of ethylene carbonate, propylene carbonate, and butylene carbonate.

11. The curable coating composition of claim 1, wherein the reaction product (3) is present in an amount ranging from 5 to 25 weight percent resin solids, based on weight of total resin solids present in the composition.

12. The curable coating composition of claim 1, wherein the reaction product (3) is present in an amount ranging from 10 to 20 percent resin solids, based on weight of total resin solids present in the composition.

13. The curable coating composition of claim 1 wherein the composition comprises a water-based composition.

14. The curable coating composition of claim 1 wherein the composition comprises solvent-based composition.

* * * * *